US005890654A

United States Patent [19]

Dupre

[11] Patent Number: 5,890,654

[45] Date of Patent: Apr. 6, 1999

[54] SNOW MAKING TOWER

[76] Inventor: Herman K. Dupre, c/o Seven Springs, Champion, Pa. 15622

[21] Appl. No.: 911,240

[22] Filed: Aug. 15, 1997

[51] Int. Cl.⁶ .............................. A01G 15/00; F25C 3/04

[52] U.S. Cl. .......................... 239/14.2; 239/2.2; 239/280; 239/280.5

[58] Field of Search .................................... 239/2.2, 14.2, 239/280, 280.5

[56] References Cited

U.S. PATENT DOCUMENTS

| | | | |
|---|---|---|---|
| 3,761,020 | 9/1973 | Tropeano et al. | 239/2 |
| 3,822,825 | 7/1974 | Dupre | 239/14 |
| 3,952,949 | 4/1976 | Dupre | 239/2.2 |
| 3,964,682 | 6/1976 | Tropeano et al. | 239/2.2 |
| 4,073,186 | 2/1978 | Erwin, Jr. | 73/114 |
| 4,087,362 | 5/1978 | Hutto, Jr. | 210/249 |
| 4,199,103 | 4/1980 | Dupre | 239/14 |
| 4,545,529 | 10/1985 | Tropeano et al. | 239/2 |
| 5,004,151 | 4/1991 | Dupre | 239/14.2 X |
| 5,360,163 | 11/1994 | Dupre | 239/14 |
| 5,667,137 | 9/1997 | Dupre | 239/14.2 |

*Primary Examiner*—Andres Kashnikow
*Assistant Examiner*—Robin O. Evans
*Attorney, Agent, or Firm*—Carothers & Carothers

[57] ABSTRACT

An elongated pipe tower extends upwardly at an acute angle from vertical with snow making nozzles in an upper end portion of the tower. Supply connections are provided at the lower end of the tower for connection to remote sources of air under pressure for supplying air and water under pressure to the nozzles for discharge into ambient atmosphere for manufacturing snow in sub-freezing conditions. The upper end portion of the tower protrudes upwardly at an angle from the tower and the nozzles are positioned on the outer side of the tower upper end portion facing outwardly away from the tower and the tower base. The nozzles are positioned such that the combined resultant thrust of the suspended weight of the tower itself and the thrust of discharged air and water under pressure through the nozzles is caused to be in substantial alignment with the tower, thereby preventing application of undue stress on the tower and permitting the use of a lightweight pipe tower. The nozzles are also positioned to provide maximum loft and throw of the manufactured snow. The snow tower is also pivoted intermediate its upper and lower ends on the upper end of a support arm so that the tower may be pivoted in a vertical plane from parallel alignment with the support arm to positions below horizontal for maintenance access.

35 Claims, 7 Drawing Sheets

SNOW MAKING TOWER

BACKGROUND OF THE INVENTION

This invention relates generally to fluid sprinkling and more particularly to snow making towers for ski slopes.

More particularly, this invention pertains to improvements in snow making towers of the type disclosed in my U.S. Pat. No. 5,360,163, issued Nov. 1, 1994 for ADJUSTABLE SNOW MAKING TOWER. This patent discloses an adjustable snow making tower which includes a vertical ground support pole that is anchored into the ground and has a tower support pole coaxially received on this ground support pole for support of a snow tower for axial horizontal rotation on the ground support pole.

This prior art device includes a support arm that is pivotally connected intermediate its opposite ends to the upper end of the tower support pole for pivotal movement substantially from horizontal to vertical. In turn, an elongated pipe snow making tower having air and water discharge nozzles at its upper end and air and water supply connections at its lower end, is supported at its lower end portion to this support arm for pivotal movement with the support arm in a vertical plane. This configuration permits full adjustability in the horizontal and vertical planes.

A jack mechanism is provided between the support arm and the tower support pole to raise and lower the support arm along with its attached snow making tower to desired vertical positions.

Problems encountered with lean-out towers of this type is that to be effective such towers must be at least 12 feet high and therefore the pipe of which the tower is constructed must be heavy duty, three inches ID or greater. This is required in order to support the suspended weight of the tower itself and to further accommodate the relatively large thrusts applied to the tower by the discharge of air and water under pressure through the nozzles at the top of the tower.

In addition, maximum loft, throw and spreading of manufactured snow is not accomplished because the nozzles cannot be positioned at optimum angles when the tower is leaned outwardly over a ski trail.

Also, adjustable lean-out towers of the prior art require expensive and relatively heavy duty jack mechanisms to raise and lower the tower to desired vertical positions.

It is an object of the present invention to eliminate these afore described disadvantages of the prior art snow making towers of the lean-out type.

SUMMARY OF THE INVENTION

In the snow making tower of the present invention, the elongated pipe snow making tower extends upwardly at an acute angle from vertical and is provided with snow making nozzles in the upper end portion of the tower. In conventional fashion, supply connections are provided at the lower end of the tower for connection to remote sources of air and water under pressure for supplying the same to the nozzles for discharge into ambient atmosphere for manufacturing snow in sub-freezing conditions.

This upper end portion of the tower of the present invention protrudes upwardly at an angle from the tower and the nozzles are all positioned on the outer hemispherical side of this tower upper end portion such that they face outwardly away from the tower or the base of the tower. This configuration is such that the combined resultant thrust created by the suspended weight of the tower itself in combination with the thrust created by the discharge of air and water under pressure through the nozzles is substantially in alignment with the tower. This permits the use of tower pipe of much lighter weight and smaller diameters as these thrusts acting upon the pipe tower in its lean-out configuration function to help support the pipe instead of applying large unwanted torque to the upper end of the tower which could ultimately bend it or destroy it.

To accomplish the desired results of the present invention, the acute angle of the pipe tower relative to vertical is generally made approximately 30°. The tower is constructed of light weight aluminum pipe and will flex. Accordingly the weight of the pipe tower itself as supported from its base will cause this angle to generally be greater than 30° or closer to 35° from vertical.

The nozzle configuration generally includes horizontally spaced multiple air nozzles and a corresponding number of upwardly directed water spray nozzles positioned below these air nozzles and aligned for external interaction or intermixing of air and water under pressure for further atomization of discharged water. Additional water spray nozzles may also be provided in the upper end portion of the tower and positioned to direct additional water spray into the existing atomized water sprays created by the interaction of air and water from the air and water nozzles as previously described.

The upright upper end portion of the tower is usually provided with the air nozzles aligned at right angles to the upper end portion and the water nozzles are preferably aligned at approximately 45° relative to vertical. This 45° angle directed upwardly insures the maximum loft of the manufactured snow above ground and further insures the maximum throw of the snow outwardly away from the tower over the ski trail. This capability is not provided in other lean-out towers of the prior art.

Since the nozzles are facing outwardly on the upper end portion of the tower facing away from the tower and the tower base, the combined thrust of the air and water exiting the nozzles under pressure creates a reaction or back thrust which tends to attempt to slightly lift the tower back towards vertical.

When this thrust component is combined with the downwardly directed weight moment of the suspended pipe tower itself, the result is that the resultant combine thrusts tend to be substantially aligned with the tower itself thereby permitting the use of an ultra light weight tower even though it extends 12 feet or more above ground. This feature is also combined with a capability to provide maximum loft and throw of the manufactured snow over the ski trail with a lean-out tower.

The air nozzle configuration preferably includes three air nozzles horizontally spaced 60° from each other in the same horizontal plane with the center nozzle thereof facing directly opposite the pipe tower base. The air nozzles are also preferably imbedded into the upper end portion of the tower so that they will be prevented from freeze-up by the circulating warmth of the water within the metal pipe tower.

While the snow making tower of the present invention may be one of the type wherein the air and water are intermixed within the tower, it is preferred that the tower include an inner air conduit received within an outer water conduit for respectively supplying air and water under pressure to the respective air and water nozzles to provide external intermixing and interaction of the air and water under pressure. The outer water conduit of the tower of the present invention is constructed such that it covers the upper end of the tower, without any nozzle exits, for warming the upper end of the tower with water circulating therein. This prevents the accumulation of ice on the upper end of the tower which could disastrously accumulate and bring the tower down due to a excessive accumulated weight.

A bleed-off is provided in the upper end of the snow tower to bleed-off air that might be trapped in this outer conduit at the upper end of the tower so that there is complete contact of circulating warm water with the upper end of the metal pipe tower to prevent freeze-up.

Another feature of the snow making tower of the present invention is that the tower includes a substantially vertical ground support pole having a bottom end anchored into the ground. A tower support pole is coaxially mounted on this ground support pole for support and free to axially rotation thereon. An upwardly extending support arm has its lower end connected to the upper end of this tower support pole. In this fashion, the support arm may rotate with the tower support pole 360° in a horizontal plane.

The elongated pipe tower is pivotally secured intermediate its upper and lower ends to the upper end of this support arm for pivotal movement in a vertical plane from parallel alignment with the support arm to positions below horizontal. A securing device is provided for securing the lower or base portion of the tower to the support arm so that the tower is in parallel alignment with the support arm for standard use.

A pull line is connected between the lower end of the tower and the tower support pole or the ground support pole so that when the securing device is released the pipe tower will automatically, due to its weight distribution, rotate about the upper pivot point on the support arm to thereby lower the upper end portion of the tower, together with its nozzles, down to or toward the ground for maintenance or replacement of the nozzles.

To simply raise the tower to its operating position, one merely grasps the pull line and pulls the base portion of the tower down until once again the pipe tower is in alignment with the support arm. In this position, the securing device is then reinstalled or actuated to hold the pipe tower in parallel alignment with the support arm. Accordingly, the need for expensive and heavy jack equipment that is difficult to operate, particularly in freezing conditions, is completely eliminated.

A deicing water drip diverter is also preferably provided on the tower above the support arm for diverting water running down the tower away from the support arm. This diverter may be comprised of a partial ring secured to the underside of the tower for catching water running down the tower, and at least one diverter protrusion depends from this partial ring for diverting the water caught by the partial ring to drip away from the support arm.

The diverter is also constructed of metal so that the water circulating through the outer metal pipe of the tower also prevents freeze-up of water on the metal water drip diverger.

BRIEF DESCRIPTION OF THE DRAWINGS

Other objects and advantages appear in the following description and claims. The accompanying drawings show, for the purpose of exemplification without limiting the invention or claims thereto, certain practical embodiments illustrating the principals of this invention wherein:

DETAILED DESCRIPTION OF A PREFERRED EMBODIMENT

Figure 1:
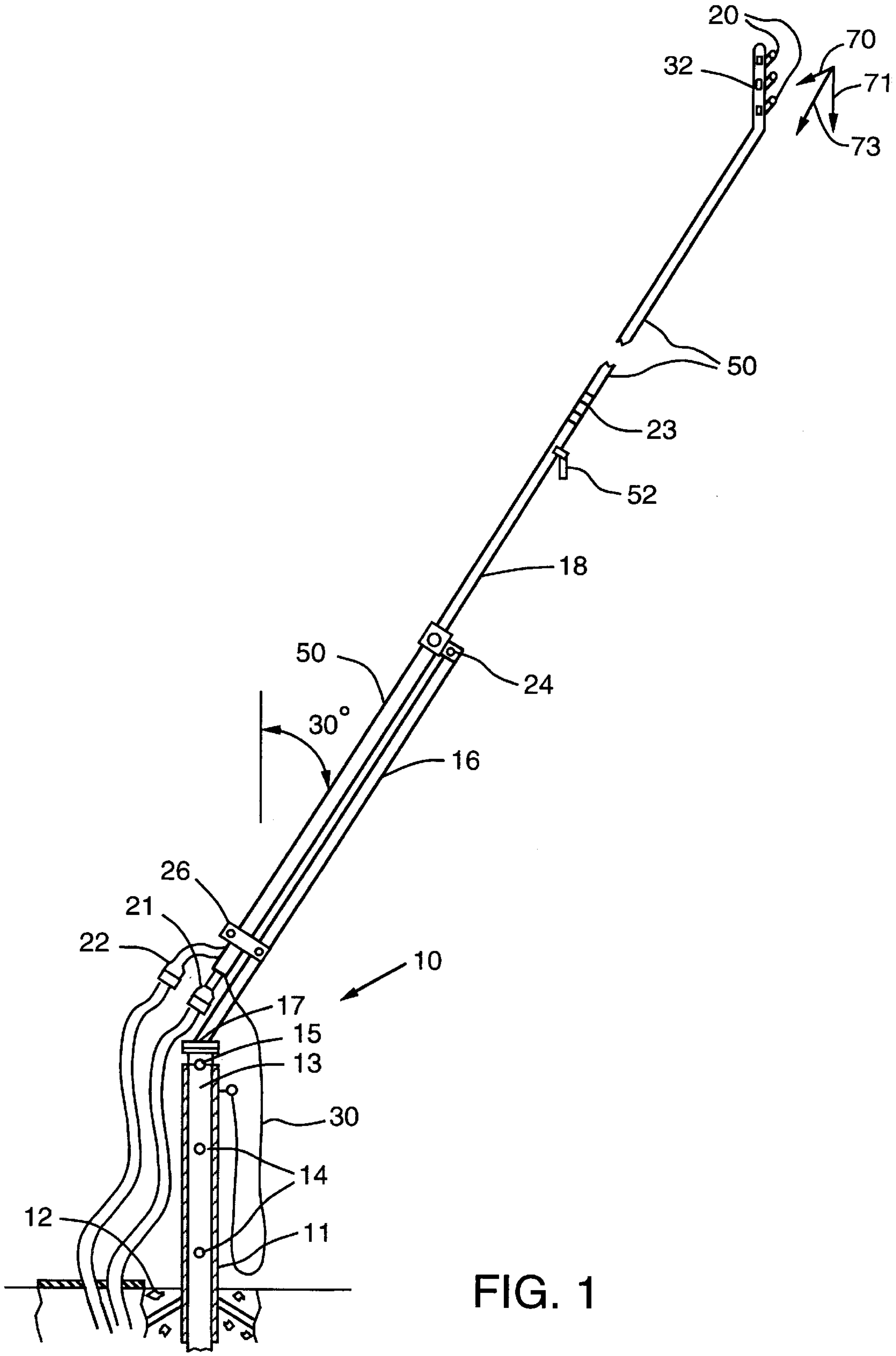
FIG. 1 is a view in side elevation of the snow making tower of the present invention with the ground support pole thereof shown in vertical mid cross section.

Referring to FIGS. 1 through 5, the snow making tower 10 of the present invention includes a substantially vertical ground support pole 11 in the form of a pipe having its bottom end anchored in ground surface 12 and a tower support pole 13 is coaxially mounted on pole 11 for support and free axial rotation thereon. In this instance, tower support pole 13 is coaxially received within ground support pole 11.

Tower support pole 13 is provided with a vertical series of horizontal through passages or holes 14 for selective reception of a horizontal support bolt 15, which rests on top of ground support pole 11.

Accordingly, the vertical height of the tower 10 may be readily adjusted by coaxially raising tower support pole 13 within ground support pole 11 until one of the underlying horizontal passages 14 is exposed above the upper end of ground support pole 11. At this point, the support bolt or pin 15 may be inserted through the exposed passage and then in turn permitted to rest upon the top of ground support pole 11 so that the tower 10 may freely rotate through 360° in a horizontal plane on tower support pole 11.

In this manner, the vertical height of the tower 10 may be readily adjusted to three different positions, depending upon the positioning of through passages 14.

Figure 2:
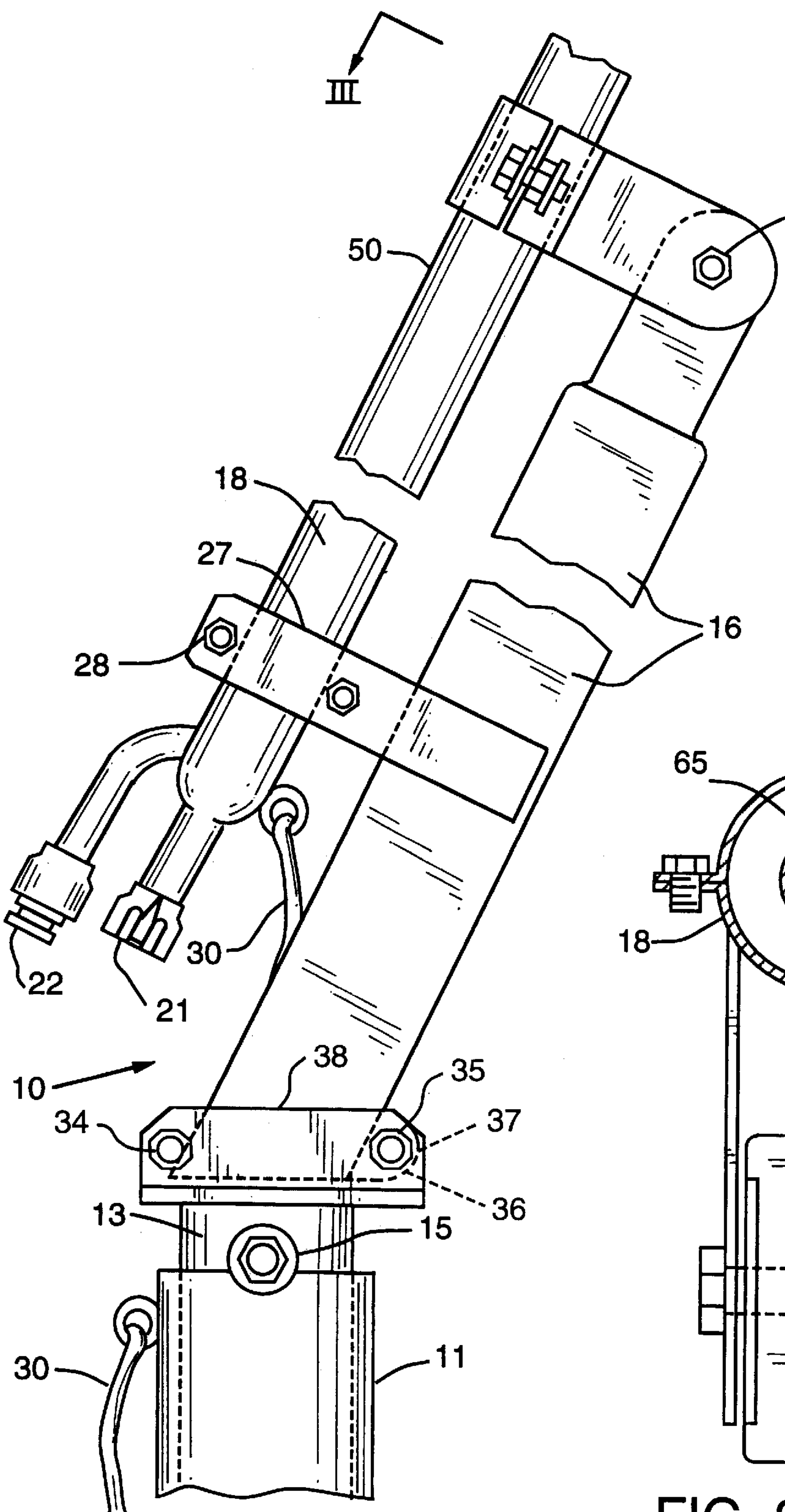
FIG. 2 is an enlarged view of the lower middle support section of the snow making tower shown in FIG. 1.
Figure 3:
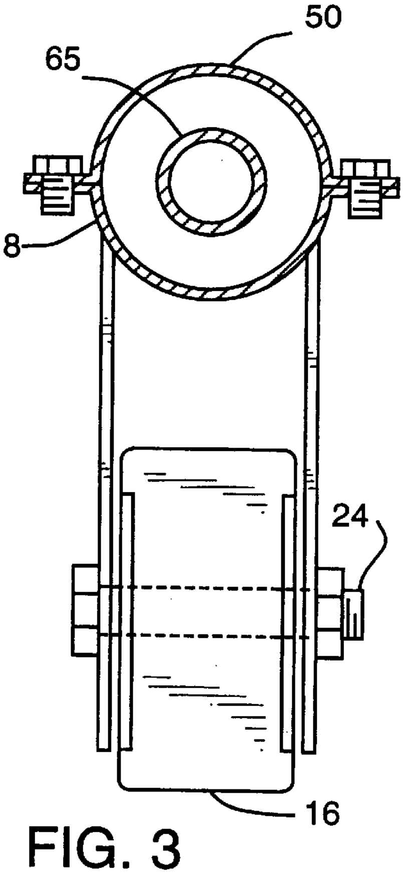
FIG. 3 is a cross sectional view of the support mechanism illustrated in FIG. 2 as seen along section line III—III.
Figure 4:
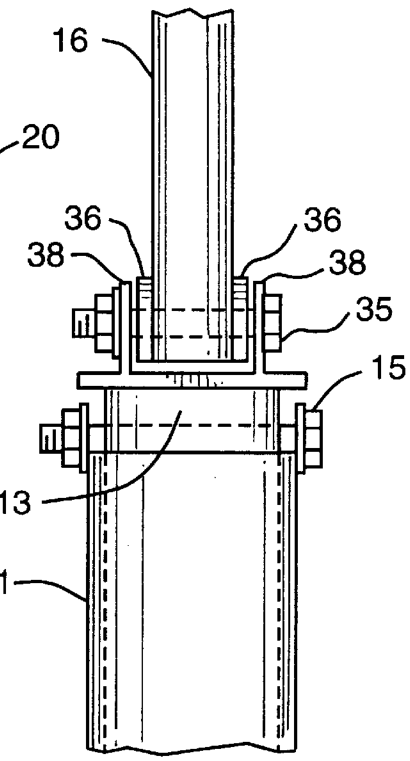
FIG. 4 is a right side view in elevation of the lower end of the support structure shown in FIG. 2.

An upwardly extending support arm 16 has its lower end rigidly connected at 17 to the upper end of support pipe 13, as best illustrated in FIGS. 2 and 4.

Elongated pipe snow making tower 18 is provided with snow making nozzles 20 adjacent the upper end of the tower and air and water supply connections 21 and 22 respectively are provided at the lower end of tower 18 for connection to remote sources of air and water under pressure for supply thereof to nozzles 20 for discharge into ambient atmosphere through the nozzles 20 for manufacturing snow in sub-freezing conditions.

Tower 18 is constructed of light weight two inch ID aluminum pipe in upper and lower sections which are secured together with a steel sleeve coupling 23. Water is supplied through this outer aluminum pipe and air under pressure is supplied through pipe tower 18 by a coaxial inner pipe with a ¾ inch ID, thereby providing an extremely light weight pipe snow tower which extends at least 20 feet above the ground support pipe 13.

Figure 5:
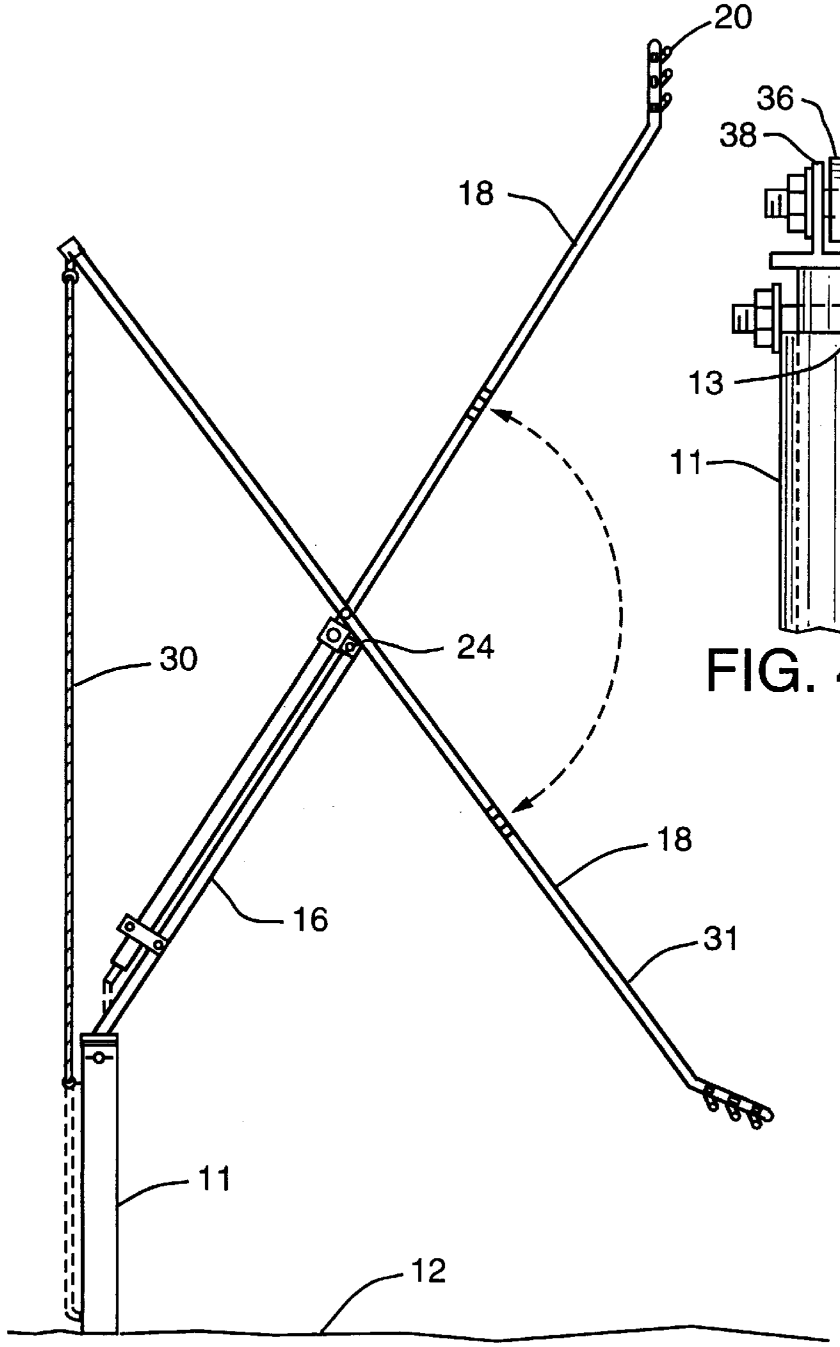
FIG. 5 is reduced a view in side elevation of the snow making tower shown in FIG. 1 illustrating the pipe tower in its alternative full upright position and full down maintenance position.

Pipe tower 18 is secured intermediate its upper and lower ends to the upper end of support arm 16 for pivotal movement about pivot 24 for vertical movement in a vertical plane from parallel alignment with support arm 16 to positions below horizontal as best illustrated in FIG. 5.

Support arm 16 is positioned at an acute angle from vertical and in this instance at 30° from vertical as indicated.

A securing device 26 is provided at the base portion of tower 18 to secure the tower 18 in parallel alignment with support arm 16. Securing device 26 consists of two spaced ears 27 projecting from support arm 16 with a snap engagement pin 28 passing through aligned openings in the upper ends of ears 27 to retain the lower end of pipe tower 18 between ears 27.

When it is desired to conduct maintenance on or replacement of nozzles 20 at the top of tower 18, one merely removes snap pin 28 which automatically permits tower 18 to rotate clockwise about pivot 24 so that nozzles 20 are positioned near the ground for engagement by maintenance personnel, as illustrated in FIG. 5.

Pull cord 30 is connected between the bottom end of tower 18 and the upper end of ground support pole 11. Line 30 may be of any flexible line such as rope and its length is limited so that as tower 18 rotates clockwise, as seen in the figures, about pivot 24, pull line 30 will be stretched to its maximum length when the tower 18 is in its down position as illustrated at position 31 in FIG. 5.

When maintenance has been accomplished and one wants to raise the tower once again to its operating position, one merely pulls on pull line 30 to bring tower 18 back into parallel alignment with support arm 16. At this point, snap pin 28 is reinserted between ears 27 to secure tower 18 in this aligned position.

With particular reference to FIGS. 2 and 4, it will be noted that support arm 16 is welded at its base to and between ears 36. Ears 36 protrude away from the base of support arm 16 as indicated at 37 in FIG. 2.

Pivot bolt 35 then protrudes through inner ears 36 and also penetrates outer ears 38, which are welded to the top of support pole 13. With this arrangement, the support arm 16 may also be pivoted about horizontal pivot bolt 35 and lowered to the ground by merely first removing keeper bolt 34, which spans through and between ears 38 and, when engaged as illustrated in FIG. 2, engages the bottom end of support arm 16, thereby preventing it from rotating about pivot bolt 35.

This arrangement permits support arm 16 to also be lowered to the ground by pivoting it about pivot bolt 35 and then pivot bolt 35 may also be readily removed and the entire tower structure 10 may be relocated and installed on another support 13 with ears 38 at a different location.

The upper end portion 32 of tower 18 contains nozzles 20 and this upper end portion protrudes upwardly at an angle relative to tower 18 when the pipe tower is in parallel alignment with support arm 16 as indicated in the drawings. In this instance, upper end portion 32 extends at an angle such that it projects vertically upward.

Figure 12:
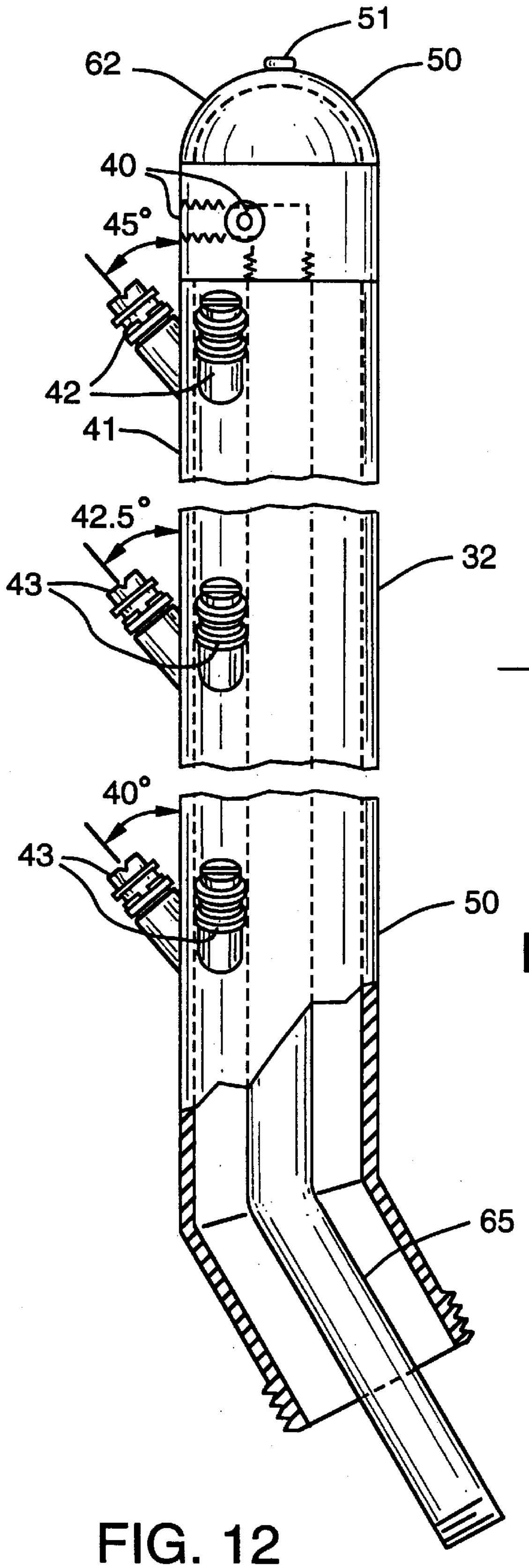
FIG. 12 is an enlarged view in back vertical elevation showing the upper end portion of the snow making tower of FIG. 1.
Figure 13:
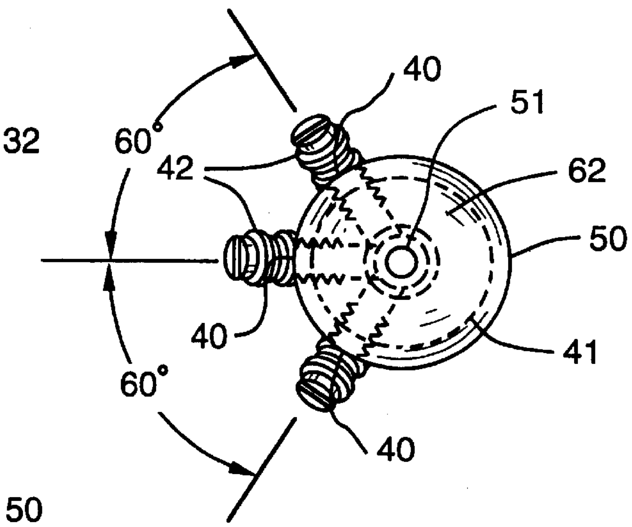
FIG. 13 is a top plan view of the upper end portion of the tower illustrated in FIG. 12.

Referring to FIGS. 12 and 13, nozzles 20 include three horizontally spaced air nozzles 40 positioned on an outer hemispherical side 41 of tower upper end portion 32 that faces away from the tower 18 and its ground support pole 13.

A corresponding number of upwardly directed water spray nozzles 42 are positioned below the air nozzles 40 and aligned for external interaction of air and water under pressure for further atomization of water discharged from water nozzles 42.

Additional water spray nozzles 43 are also provided in the upper end portion 32 of tower 18 and positioned to direct additional water spray into atomized water sprays created by the interaction of air and water emitted from nozzles 40 and 42.

The air nozzles 40 are aligned at right angles relative to the upper end portion 32 of tower 18 and water nozzles 42 are aligned at approximately 45° relative to vertical.

The three air nozzles 40 are spaced 60° from each other in the same horizontal plane with the center nozzle thereof facing opposite from ground support pole 13.

Air nozzles 40 are embedded into upper end portion 32 of the tower to prevent freeze-up of nozzles or freeze-up of water particles contained in the air which exits the nozzles 40.

As previously mentioned, an inner air conduit supplies air under pressure to air nozzles 40 and the outer water conduit or pipe of tower 18 supplies water under pressure to all water nozzles 42 and 43. The air conduit is therefore prevented from freezing because of the surrounding warmth of circulating water.

The outer water conduit 50 also covers the upper end of tower 18 as best illustrated in FIGS. 12 and 13 for warming the upper end of the tower with water circulating therein.

A bleed-off valve 51 is provided at the upper end of the tower for bleeding off air that may be trapped in this outer conduit 50 at the upper end of the tower.

This bleed-off valve 51 will cause a small amount of water to continuously escape from the upper end of the tower and this water will run and drip down the underside of tower 18.

This has an advantageous effect of providing further cooling to the tower due to the evaporation of water running down the outside of the tower 18. However, it has a disadvantageous effect in that it can drip down and freeze-up on support arm 18, which is not insulated by the circulating water, and cause an ice buildup thereon which will cause the entire tower to fail and collapse.

Figure 6:
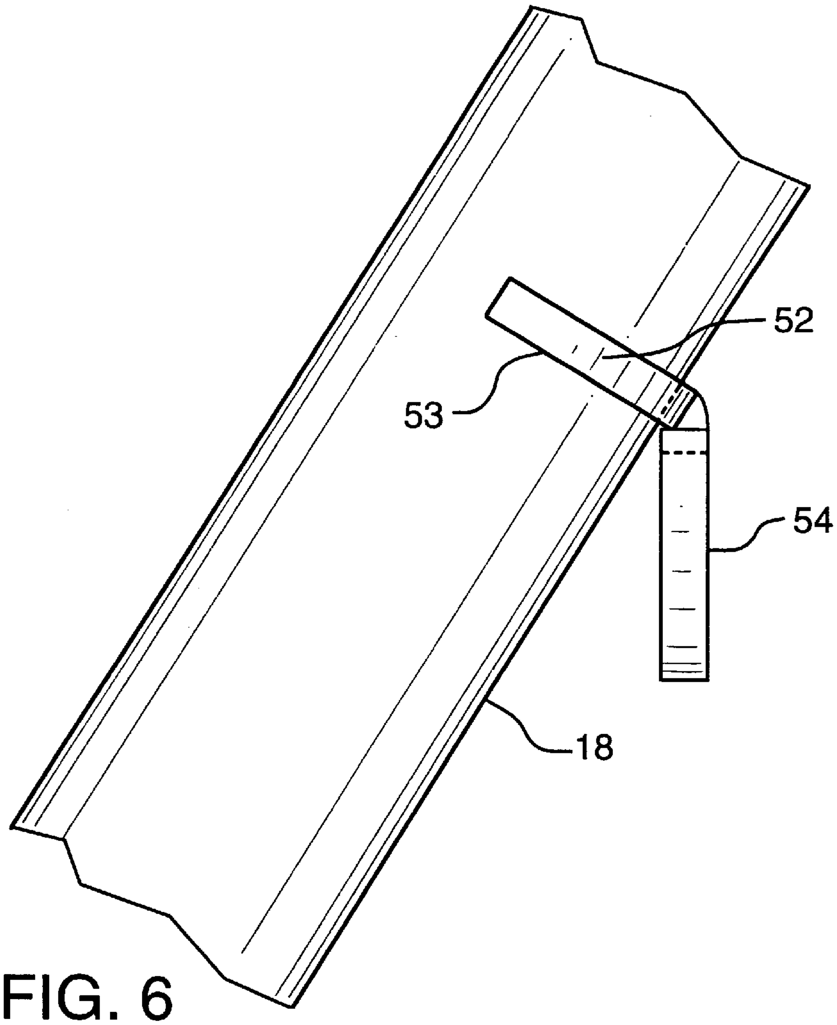
FIG. 6 is an enlarged view of a central portion of the snow making tower shown in FIG. 1 illustrating the details of the water drip diverter.
Figure 7:
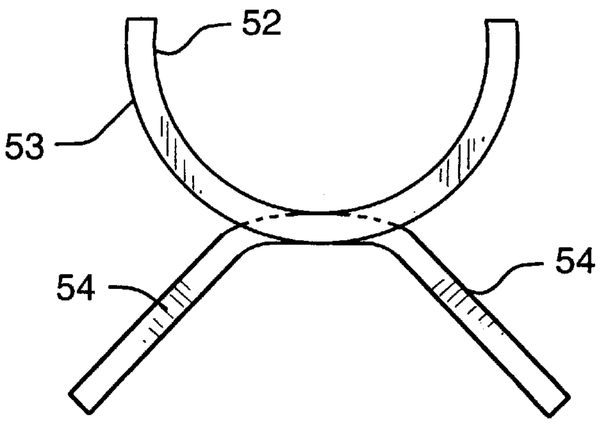
FIG. 7 is a right side front end view of the diverter shown in FIG. 6 without the pipe tower.

In order to prevent this, a deicing water drip diverter 52 is provided on the tower 18 above support arm 16 for diverting water running down the tower away from the support arm. The diverter is comprised of a partial ring 53 for catching water running down the tower and two diverter protrusions 54 which depend from partial ring 53 for diverting water caught by partial ring 53 away from underlying support arm 16. The details of the diverter are best illustrated in FIGS. 6 and 7.

The pipe tower 18 and the diverter 52 are both made of metal, preferably aluminum, so that they readily transmit heat to keep them ice free due to the warmth from the water circulating within pipe tower 18.

Figure 10:
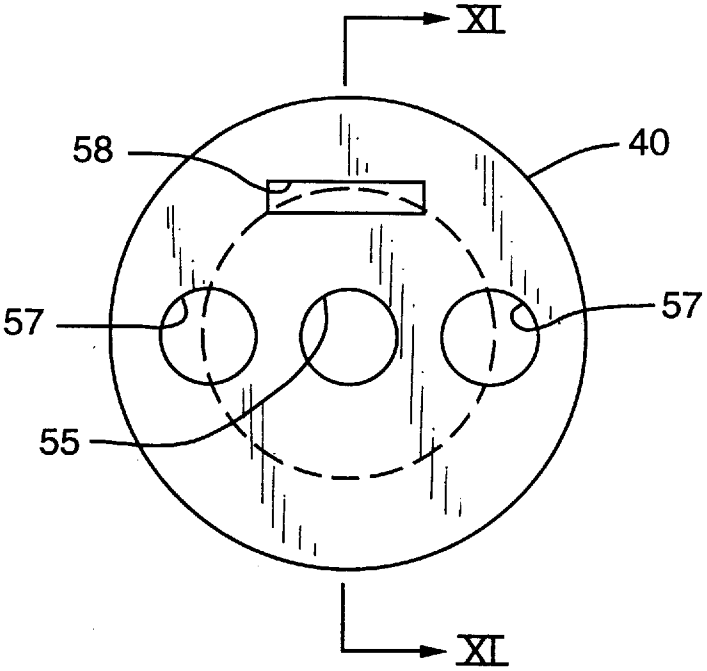
FIG. 10 is a face view in front elevation of an air nozzle used in the upper end of the snow making tower shown in FIG. 1.
Figure 11:
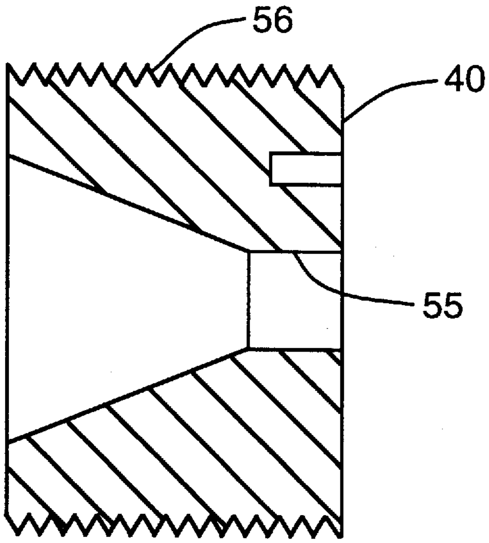
FIG. 11 is a left side view in vertical cross section of the air nozzle shown in FIG. 10 as seen along section line XI—XI.

The details of air nozzles 40 are illustrated in FIGS. 10 and 11.

The air nozzles 40 have a central air nozzle passage 55 and they are in the form of a plug having a threaded exterior 56 which is threadably received in the wall of tower upper portion 32 so that the air nozzles 40 are fully embedded within the walls of tower 18 and sealed with O-rings 45. Exterior thread 56 is a standard machine thread, as opposed to a pipe thread. This permits easy exchange of air nozzles 40 and the threads will not bind as may be experienced with conventional pipe thread. While this machine thread will be less apt to bind, it can create air leaks, which is prevented by the O-ring seals 45 provided at the base of each air nozzle plug 40.

Turning apertures 57 are provided for inserting a tool to turn or unscrew or screw in each air valve 40. Additionally a turning slot 58 is also provided in the face of valve 40 so that a tool, such as a screw driver tip, may be placed in slot 58 to threadably turn valve 40 to seat or unseat it from upper end portion 32 of the tower.

Figure 8:
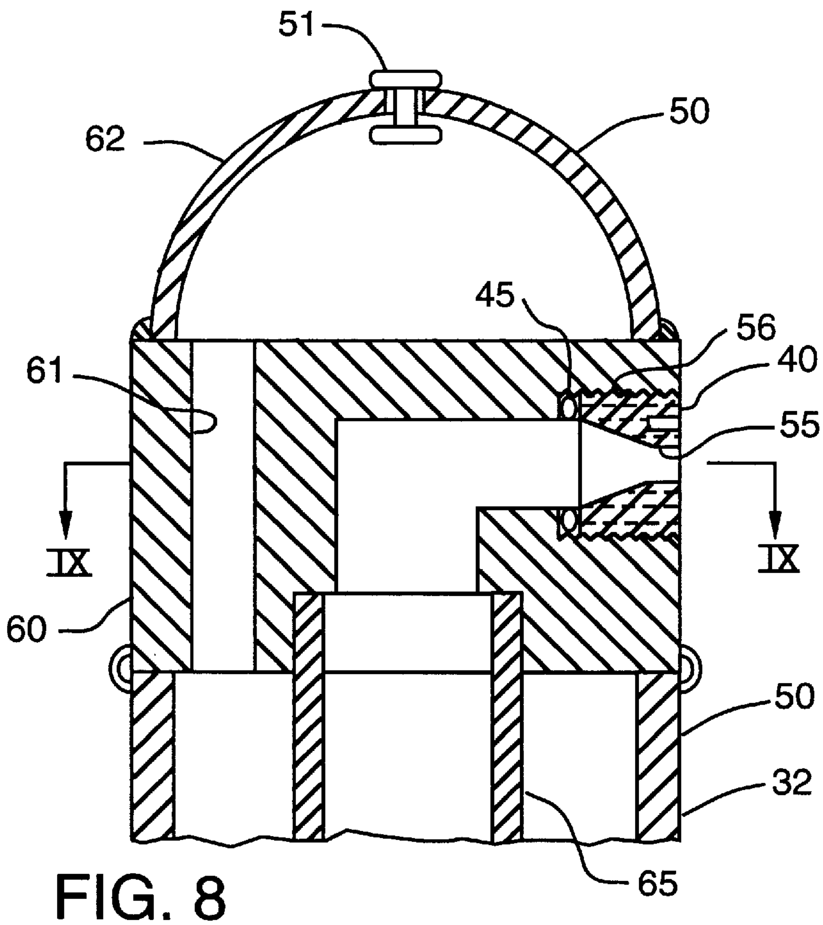
FIG. 8 is an enlarged view of the upper end of the snow making tower of FIG. 5 shown in vertical mid section.
Figure 9:
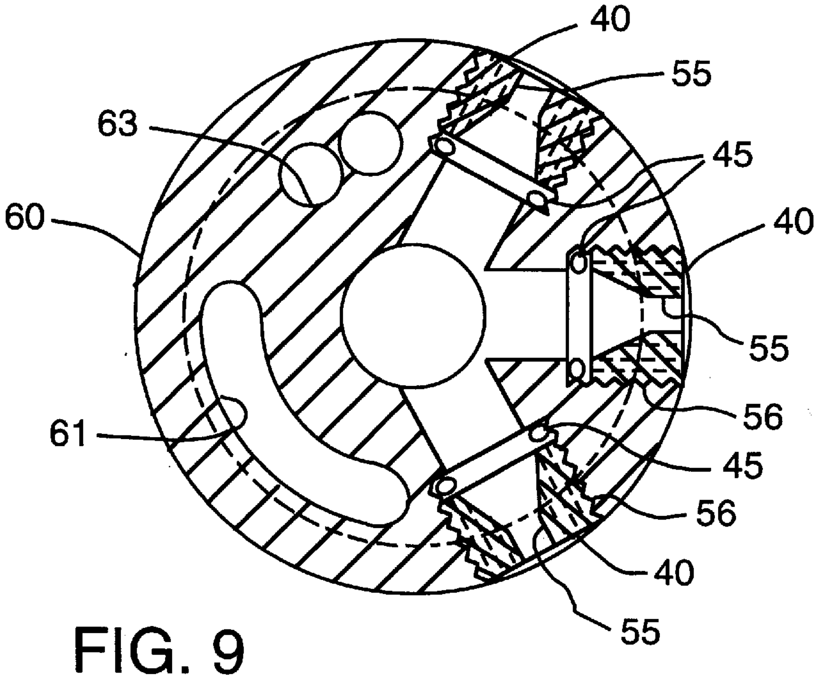
FIG. 9 is a top plan view in cross section of the tower upper end shown in FIG. 8 as seen along section line IX—IX.

The arrangement of air nozzles 40 is best illustrated in FIGS. 8 and 9.

Referring to these figures, water is supplied under pressure through outside aluminum pipe 50 through air nozzle housing 60 via passage 61 into the interior of the upper end of tower 18 to upper end dome 62. This circulating water is then permitted to pass or circulate back through passages 63 in air nozzle housing 60 so that the water will continuously circulate within dome 62 thereby preventing external freeze-up of moisture or water on dome 62 at the upper end of the tower.

In order to permit air to readily escape from within dome 62 at the upper end of the tower, the bleed-off valve 51 is provided at the upper end as previously explained.

Air under pressure is supplied by internal conduit or metal pipe 65 which is coaxially received within outer pipe 50 and is connected to air nozzle housing 60 as indicated to feed the three air nozzles 40.

Referring again to FIG. 1, a small vector diagram is illustrated adjacent the upper end portion 32 of the tower.

The back thrust or thrust exerted on the upper end of tower 18 by nozzles 20 is illustrated or indicated by force vector 70. The downward suspended weight of tower 18 as it hangs suspended from support arm 16 is illustrated by force vector 71. In actuality, this weight as illustrated by vectors 71 causes the resultant angle of tower 18 to be more closely to 35° from vertical near the upper end of the tower rather than 30° as previously indicated at the base of the tower.

In any regard, the resultant cumulative force of the thrust 70 created by the nozzles and the downward thrust 71 of the suspended tower weight provides a resultant vector force 73 which is substantially in alignment with tower 18.

The result of this is that minimal stress is placed on tower 18 and therefore a much lighter tower may be utilized even for tower extensions which go beyond twelve feet above ground level. This means that 2 or 3 inch aluminum outer pipe can be used instead of heavier weight 3 to 4 inch ID pipe.

In addition, the vertically extending upper end portion 32 of the tower permits the water nozzles and air nozzles to be angled at positions such that the water sprays are generally projected outward and upward at an angle of approximately 45° relative to vertical thereby throwing all manufactured snow out and away from the tower structure to better cover the underlying snow ski trail thereby providing a maximum possible loft and throw of the manufactured snow. Accordingly, the snow coverage is spread out over an area of approximately 180° away from the base of the tower, as opposed to the prior art towers which cover an area of only approximately 120° of spread. This insures that the manufactured snow will not pile up.

In addition, the snow making towers of the prior art also tend to have a portion of the water, and therefore the manufactured snow, to be projected back toward the base of the tower. The structure of the present invention prevents this wasteful condition from occurring, and as previously indicated, provides a tower wherein the nozzles are appropriately arranged such that their thrust permits the use of lighter weight pipe and insures maximum loft and throw of the manufactured snow over a uniform area.

I claim:

1. A snow making tower comprising: an elongated pipe tower extending upwardly from a support at an acute angle from vertical and having an upper end portion and a lower end with snow making nozzles in said upper end portion of said tower and supply connections at the lower end of said tower for connection to remote sources of air and water under pressure for supply thereof to said nozzles for discharge into ambient atmosphere for manufacturing snow in sub-freezing conditions, said upper end portion of said tower protruding upwardly at an angle from said tower, said nozzles positioned on an outer side of said tower upper end portion facing outwardly away from the tower support and angled relative to said upper end portion whereby combined resultant thrust created by the suspended weight of said tower and discharge of air and water under pressure through said nozzles is substantially in alignment with said tower.

2. The snow making tower of claim 1, wherein said pipe tower includes aluminum pipe with a maximum inside diameter of three inches and extends for a minimum length of at least twelve feet.

3. The snow making tower of claim 1, wherein said acute angle is approximately 30°.

4. The snow making tower of claim 1, said nozzles including horizontally spaced multiple air nozzles and further including a corresponding number of upwardly directed water spray nozzles positioned below said air nozzles and aligned for external interaction of air and water under pressure for further atomization of discharged water.

5. The snow making tower of claim 4, including additional water spray nozzles in said upper end portion of said tower and positioned to direct additional water spray into atomized water sprays created by the interaction of air and water from said air and water nozzles.

6. The snow making tower of claim 4, said water nozzles aligned at approximately 45° relative to vertical.

7. The snow making tower of claim 6, including three air nozzles horizontally spaced 60° from each other in the same horizontal plane with the center nozzle thereof facing opposite said pipe tower.

8. The snow making tower of claim 6, wherein said air nozzles are embedded into said upper end portion of said tower.

9. The snow making tower of claim 8, wherein said tower includes an inner air conduit received within an outer water conduit for respectively supplying air and water under pressure to said air and water nozzles.

10. The snow making tower of claim 9, wherein said outer water conduit covers the upper end of said tower without nozzle exits for warming said upper end with water circulating therein.

11. The snow making tower of claim 10, including a bleed-off in the upper end of said tower for bleeding off air trapped in said outer conduit at said upper end of said tower.

12. The snow making tower of claim 1, including a substantially vertical ground support pole having a bottom end anchored in a ground surface, a tower support pole having upper and lower ends and coaxially mounted on said pole for support and free axial rotation thereon, and an upwardly extending support arm having upper and lower ends with its lower end secured to the upper end of said tower support pole, said elongated pipe tower pivotally secured intermediate its ends to the upper end of said support arm for pivotal movement in a vertical plane from parallel alignment with said support arm to positions below horizontal.

13. The snow making tower of claim 12, including a securing device for securing a base portion of said tower in parallel alignment with said support arm.

14. The snow making tower of claim 13, including a deicing water drip diverter on said tower above said support arm for diverting water running down said tower away from said support arm.

15. The snow making tower of claim 14, said diverter comprised of a partial ring secured to an underside of the tower for catching water running down said tower, and at least one diverter protrusion depending from said partial ring for diverting water caught by said partial ring away from said support arm.

16. The snow making tower of claim 15, wherein said tower and diverter are metal.

17. A snow making tower comprising: a substantially vertical ground support pole having a bottom end anchored in a ground surface, a tower support pole having upper and lower ends and coaxially mounted on said ground support pole for support and free axial rotation thereon, an upwardly extending support arm having upper and lower ends with its lower end secured to the upper end of said tower support pole, an elongated pipe snow making tower having an upper end and a lower end with snow making nozzles adjacent the upper end of said tower and supply connections at the lower end of said tower for connection to remote sources of air and water under pressure for supply thereof to said nozzles for discharge into ambient atmosphere for manufacturing snow in sub-freezing conditions, said tower pivotally secured intermediate its ends to the upper end of said support arm for pivotal movement in a vertical plane from parallel alignment with said support arm to positions below horizontal.

18. The snow making tower of claim 17, said support arm positioned at an acute angle from vertical.

19. The snow making tower of claim 18, including a securing device for securing a base portion of said tower in parallel alignment with said support arm.

20. The snow making tower of claim 19, wherein an upper end portion of said tower contains said nozzles and protrudes upwardly at an angle to said tower when said pipe tower base portion is aligned in parallel with said support arm.

21. The snow making tower of claim 20, wherein said acute angle of said support arm is approximately 30°.

22. The snow making tower of claim 20, including a pull line connected to the lower end of said tower.

23. The snow making tower of claim 20, said nozzles including horizontally spaced multiple air nozzles positioned on an outer side of said tower upper end portion facing away from said ground support pole, and further including a corresponding number of upwardly directed water spray nozzles positioned below said air nozzles and aligned for external interaction of air and water under pressure for further atomization of discharged water.

24. The snow making tower of claim 23, including additional water spray nozzles in said upper end portion of said tower and positioned to direct additional water spray into atomized water sprays created by the interaction of air and water from said air and water nozzles.

25. The snow making tower of claim 23, said water nozzles aligned at approximately 45° relative to vertical.

26. The snow making tower of claim 25, wherein there are three air nozzles horizontally spaced 60° from each other in the same horizontal plane with the center nozzle thereof facing opposite said ground support pole.

27. The snow making tower of claim 25, wherein said air nozzles are imbedded into said upper end portion of said tower.

28. The snow making tower of claim 27, wherein said tower includes an inner air conduit received within an outer water conduit for respectively supplying air and water under pressure to said air and water nozzles.

29. The snow making tower of claim 28, wherein said outer water conduit covers the upper end of said tower for warming said upper end with water circulating therein.

30. The snow making tower of claim 29, including a bleed-off in the upper end of said tower for bleeding off air trapped in said outer conduit at said upper end of said tower.

31. The snow making tower of claim 28, including a de-icing water drip diverter on said tower above said support arm for diverting water running down said tower away from said support arm.

32. The snow making tower of claim 31, said diverter comprised of a partial ring secured to an underside of the tower for catching water running down said tower, and at least one diverter protrusion depending from said partial ring for diverting water caught by said partial ring away from said support arm.

33. The snow making tower of claim 32, wherein said tower and diverter are metal.

34. The snow making tower of claim 17, said support arm pivotally secured at its lower end to said tower support pole for selected pivotal movement in a vertical plane.

35. A snow making tower comprising: an upwardly extending elongated pipe tower with upper and lower ends and having an inner air conduit received in an outer water conduit for respectively supplying air and water under pressure to air and water nozzles at an upper end portion of said tower for external ambient mixing thereof for manufacturing snow in sub-freezing conditions, said outer conduit covering the upper end of said tower with no nozzle exits for warming said upper end with water circulating therein, a continuous bleed-off in the upper end of said tower for continuously bleeding of air trapped in said outer conduit at the upper end of said tower, and a de-icing water drip diverter on said tower for diverting water running down said tower away from portions of said tower which underlie said diverter.

* * * * *